3,510,559
2-ALKOXYPHENOXY-ACETAMIDES AS
ANESTHETICS AGENTS
Winfried Arnold, Dobbs Ferry, N.Y., and Charles J.
Morel, Arlesheim, Basel-Land, Switzerland, assignors to
Geigy Chemical Corporation, Greenburgh, N.Y., a corporation of Delaware
No Drawing. Continuation of application Ser. No.
423,320, Jan. 4, 1965. This application Mar. 20,
1967, Ser. No. 624,622
Claims priority, application Switzerland, Jan. 10, 1964,
278/64; Feb. 4, 1964, 1,260/64; Feb. 11, 1964,
1,633/64
Int. Cl. A61k 27/00
U.S. Cl. 424—324          5 Claims

ABSTRACT OF THE DISCLOSURE 2-alkoxyphenoxy-acetamides substituted in the 4-position by a hydroxyalkyl group in which the hydroxy group is on the terminal carbon atom of the alkyl group are anesthetic agents.

---

This is a continuation of Ser. No. 423,320, filed Jan. 4, 1965 and now abandoned.

The present invention concerns new aryloxyacetic acid amides, as well as processes for the production of these compounds which are valuable pharmaceuticals and intermediate products for the production thereof.

More in particular, this invention concerns, in a first aspect thereof, novel short-acting, quickly metabolized anesthetic agents which are especially well suited for administration in the form of solutions for intravenous injection, in a very short time, with good vein compatibility.

Short-acting, quickly metabolized, intravenously applied anesthetics should possess certain properties in order to be practically useful. Among these properties must be a sufficiently high activity to permit achievement of a narcosis of stage IV with a dose of less than 50 mg./kg. of bodyweight applied to test animals such as rabbits. This means that the active ingredient can be administered to a patient in the form of injection solutions containing not more than 5% by weight of the active substance, and that the amount of such solution that must be administered to obtain the desired anesthetic effect does not exceed a volume of 20 millimeters. Active substances which must be administered in larger volumes and/or in higher concentrations are not permissible because they lead to venous irritation and cannot be administered in the short time, e.g. a fraction of a minute, which is necessary to achieve a quick, sufficiently deep narcosis.

The present invention concerns new hydroxy-alkyl and hydroxyalkenyl substituted aryloxyacetic amides and processes for the production of these compounds which are valuable pharmaceuticals and intermediate products for the production of other pharmaceuticals.

Compounds of the formula

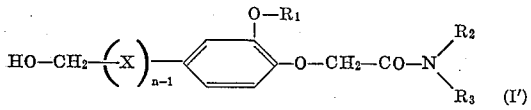

(I')

wherein

X represents the methylene group (—CH$_2$—), ethylene group (—CH$_2$—CH$_2$—) or the vinylene group (—CH=CH—)

$n$ is an integer ranging from 1 to 2, each of R$_1$ and R$_2$ represents lower alkyl,
R$_3$ represents a lower alkyl or lower alkoxy group, or
R$_2$ and R$_3$ taken together with the nitrogen atom to which they are linked represent a saturated heterocyclic radical having 5 to 6 ring members, one of which is either —CH$_2$— or oxygen, while the other ring members are —CH$_2$— groups, have not been known up to the present.

It has now been found that, unexpectedly, such compounds have valuable pharmacological properties, in particular anesthetic activity of short duration and can be used as mild short-acting anesthetics in particular for the performance of simple and short surgical operations on ambulant patients. They are preferably administered parenterally, in particular, intravenously, in the form of a dispersion or as solution in admixture with water and a clinically acceptable solubility promoter.

The fact that the compounds of Formula I' possess themselves anesthetic activity, is surprising, for they are obtained as the major moiety by saponification from the esters of Formula I described in the first aspect of this invention. In contrast thereto, the major moieties of very similar structure, obtained by saponification of known, anesthetically active esters of 3-alkoxy-4-carbamylalkoxyphenyl-alkanoic acids, i.e. the last-mentioned acids, themselves, are inactive.

In the compounds of Formula I', R$_1$ and R$_2$ and R$_3$ can be, as lower alkyl radicals, for example, the methyl, ethyl n-propyl, isopropyl, n-butyl, sec. butyl, n-amyl and isoamyl group and R$_3$ as alkoxy radical, can be the methoxy, ethoxy, propoxy, isopropoxy, n-butoxy and sec. butoxy, n-amyloxy or isoamyloxy group.

To produce a new compound of Formula I', a substituted phenol of the formula

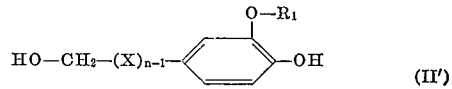

(II')

wherein X, $n$, R$_1$ have the meanings given above, is reacted in the presence of an acid binding agent, with a reactive ester of a hydroxyl compound of the formula

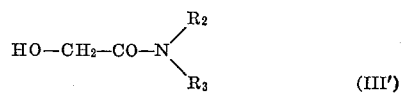

(III')

or a salt of such a phenol of Formula II', particularly an alkali metal salt, is reacted with the reactive ester of Formula III', wherein R$_2$ and R$_3$ have the meanings given in Formula I'. Suitable acid binding agents are, preferably, sodium hydroxide or a sodium alcoholate and, as solvent, a lower alkanol or a mixture of alkanol and water is suitable. Other suitable acid binding agents are sodium and potassium carbonate in acetone or another organic solvent. Also the sodium salts of the phenols of Formula II' can be used as starting materials and, in this case, a solvent not containing hydroxyl groups such as benzene, toluene, xylene or, particularly, dimethyl formamide, is used. Examples of such substituted phenols of Formula II' are 3 - methoxy-, 3 - ethoxy-, 3 - propoxy-, 3 - isopropoxy-, 3 - n - butoxy-, 3 - sec. butoxy-, 3 - n - amyloxy- and 3-isoamyloxy-derivatives of 4 - hydroxy - benzyl alcohol as well as of 4 - hydroxy-phenylethyl alcohol, 3-(3'-methoxy-4'-hydroxyphenyl)-propane - 1 - ol and -2-propene-1-ol as well as the corresponding 3'-ethoxy, 3'-propoxy, 3'-isopropoxy, 3' - n - butoxy, 3'-sec. butoxy, 3'-n-amyloxy and 3'-isoamyloxy compounds. Examples of the second reaction component which embrace the reactive esters of hydroxyl compounds of the Formula III' are chloroacetic acid dimethylamide, diethylamide, pyrrolidide, piperidide, hexamethyleneimide, morpholide and -N(-ethoxy-ethylamide) as well as the methane sulfonic acid and p-toluene sulfonic acid esters of glycolic acid dimethylamide, diethylamide, pyrrolidide, piperidide, hexamethyleneimide, morpholide and -(N-ethoxy-ethylamide).

A compound of the Formula I' is obtained by a second process by reacting a substituted aryloxyacetic acid of the formula

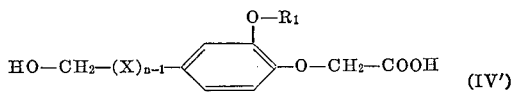
(IV')

wherein X, n, R₁ have the meanings given in Formula I', or a reactive derivative thereof with a compound of general formula

(V')

wherein R₂ and R₃ have the meanings given in Formula I'.

Suitable reactive functional derivatives of the aryloxyacetic acids of general Formula IV' are, for example, the esters, particularly low alkyl esters and the phenyl ester. Inert organic solvents such as ether and benzene hydrocarbons or also low alkanols are used as solvents for the reactions with esters.

Starting materials of the general Formula IV' are obtained, for example, by etherifying 3-alkoxy - 4 - hydroxybenzyl alcohols as well as -phenethyl alcohols, 3 - (3'-alkoxy - 4' - hydroxyphenyl)-propane - 1 - ols and -2-propene-1-ols with chloroacetic acid in the presence of ethanolic sodium hydroxide solution. Example of such substances are the 2-methoxy, 2-ethoxy, 2-propoxy, 2-isopropoxy, 2-n-butoxy, 2-n-sec. butoxy, 2-n-amyloxy and 2-isoamyloxy compounds of 4-hydroxymethyl-, 4-(2'-hydroxyethyl)-, 4-(3'-hydroxy - 1 - propenyl)- and 4-(3'-hydroxypropyl)- phenoxyacetic acid as well as their methyl and ethyl esters.

Compounds of the general Formula I' are obtained by a third method by reducing an aldehyde of the general formula

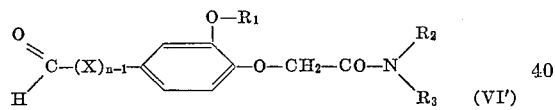
(VI')

wherein
n, X, R₁, R₂ and R₃ have the meanings given in Formula I', to form a corresponding hydroxyl compound. If a substituted cinnamaldehyde—i.e. a compound of general Formula VI' wherein X is a vinylene group—is used as starting material then, the vinylene group in addition to the aldehyde group can be reduced in one step whereupon a correspondingly substituted hydrocinnamic alcohol is obtained. The compounds of general Formula VI' are reduced, for example, by means of hydrogen in the presence of a catalyst such as Raney nickel at about 20–80° and under a pressure of about 1–100 atmospheres, the reduction preferably being performed in a solvent such as a low alkanol or dioxan. Aluminum isopropylate, which is soluble in isopropanol, is also a suitable reducing agent, particularly for the production of compounds embraced by general Formula I' in which X is the vinylene group, and n is 2.

The starting materials of general Formula VI' are produced, for example, by condensing 3-alkoxy-4-hydroxybenzaldehyde, -phenylacetaldehyde, -cinnamaldehyde and -hydrocinnamaldehyde with chloroacetic acid diethylamide, pyrrolidide, piperidide, hexamethyleneimide or morpholide, the condensation being performed in the presence of alcoholic sodium hydroxide solution. Examples of such starting materials are, e.g. the 2-methoxy, 2-ethoxy, 2-propoxy, 2-isopropoxy, 2-n-butoxy, 2-sec. butoxy, 2-n-amyloxy and 2-isoamyloxy derivatives of 4-formyl-, 4 - formylmethyl-, 4-(2'-formyl-ethyl)-, 4-(2'-formyl-vinyl)-phenoxyacetic acid diethylamide or the corresponding dimethylamide, morpholide, pyrrolidide, piperidide, hexamethyleneimide derivatives.

A compound of the general Formula I' is produced by a fourth process by converting, in the manner known per se, a substituted phenylalkene of general formula

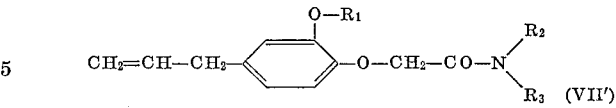
(VII')

wherein R₁, R₂ and R₃ have the meanings given in Formula I', into the corresponding ω-phenyl alkanol. The conversion is performed by reacting diborane at about 20–45° with compounds of the general Formula VII' in a solvent such as diethylene glycol dimethyl ether and then, in one step, hydrolysing the substituted phenylalkyl boranes formed as intermediate products with water as well as with aqueous sodium hydroxide solution at about 20–30° and oxidizing them with hydrogen peroxide at about 20–60°. Another method possible for the production of the ω-phenyl alkanols consists in oxidizing the compounds of general Formula VII' with a per acid such as benzoic per acid, in a solvent such as, e.g. chloroform or benzene, to form 4-(2',3'-epoxypropyl)-phenyl compounds and then reducing the epoxides with hydrogen in the presence of a catalyst such as Raney nickel to form the ω-phenyl alkanols, the reduction being performed in a solvent such as, e.g. methanol or dioxan. The oxidation is performed at temperatures of about 20–80° and the reduction at about 20–100° under about 1–100 atmospheres pressure.

The 2-methoxy, 2-ethoxy, 2-propoxy, 2-isopropoxy, 2-n-butoxy, 2-sec. butoxy, 2-n-amyloxy and 2-isoamyloxy derivatives of 4-allyl-phenoxyacetic acid dimethylamide, diethylamide, dipropylamide, di-n-butylamide, pyrrolidide, piperidide and hexamethyleneimide are mentioned as starting materials of the Formula VII'.

A compound of the Formula I' is obtained by a fifth process by reducing a substituted hydroxypropenyl compound of the formula

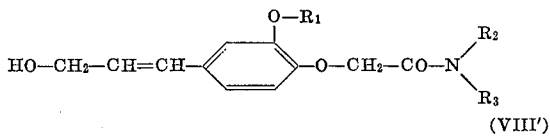
(VIII')

wherein R₁, R₂ and R₃ have the meanings given in Formula I', which compound is also embraced by that formula, to form the corresponding hydroxypropyl compound. The reduction is performed for example, by means of hydrogen in the presence of a catalyst such as Raney nickel, e.g. in a lower alkanol or dioxan, at a temperature of about 20–100° and a pressure of about 1–100 atmospheres.

As mentioned above, the new anesthetic agents falling under Formulas I and I' are administered preferably, intravenously. The liquids for injection contain 1–5% of active substance, water, a solubilizing agent or emulsifying agent. The following compounds can be used as solubilizing or emulsifying agents: propylene glycol, sodium benzoate or the sodium salt of a hydroxybenzoic acid (analogously to the German Pat. No. 1,091,288), water soluble salts of bile acids such as sodium dehydrocholate, morpholine desoxycholate, ethanolamine cholate (analogously to German Pat. No. 1,089,510), salts of α-naphthyl acetic acid with sodium or organic bases such as morpholine and diethanolamine (analogously to German Pat. No. 1,147,055), as well as histamine and pyrogen free inositol phosphatide preparations and lecithin preparations having a low content of oil, optionally with partial glycerides of higher fatty acids such as mono- or di-olein, and/or their polyoxyethylene derivatives (analogously to U.S. Pat. No. 3,044,931).

A dispersion of 1–5% of active substance, 10–25%, generally 15–20% of polyethylene derivative of ricinoleic acid or of its glycerides, e.g. the commercial product Cremophor EL®, 5–15%, generally about 10%, of propylene glycol, 1–5%, generally about 2.5%, of poly-(N-vinyl-2-pyrrolidone), e.g. the commercial product Kollidon 25® of medium molcular weight of about 20,000 to 25,000, and optionally, up to about 1.5% of glucose, is particularly suitable.

Such a dispersion can be produced, for example, as follows:

(a) 2.5 g. of 2-methoxy-4-(3'-hydroxy-1'-propenyl)-phenoxy-acetic acid diethylamide are dissolved, with slight heating, in a mixture of 15.0 g. of Cremophor EL® (density 1.050–1.070 at 25° C., viscosity 550–850 cp. at 25° C., saponification number 56–66, hydroxyl number 57–80, manufactured by BASF, Ludwigshafen, Germany), and 10.0 g. of propylene glycol. 2.5 g. of Kollidon 25® biologically tested poly(N-vinyl-2-pyrrolidone) and 1.5 g. of glucose are dissolved in 60 g. of distilled water. The two solutions are mixed and the volume is made up to 100 ml. with distilled water. After filtering through a glass filter G4, the solution is filled into colorless ampoules of 5 or 10 ml. and sterilized in an autoclave for 20 minutes at 120° and 1 atm. excess pressure. The solutions so produced contain 25 mg. of active substance per milliliter.

(b) A solution having the same content of active substance is obtained on using 15.0 g. of propylene glycol, 5.0 g. of Kollidon 25®; no glucose and the same amounts of the other components.

The following non-limitative examples illustrate the production of the new compounds of general Formula I' and of novel intermediate products. The temperatures are given in degrees centigrade. In these examples, "abs." means "anhydrous," "g." means "gram," "ml." means "milliliter," and "torr" means "mm. Hg."

EXAMPLE 1

(a) Dry hydrogen chloride is introduced into a solution of 10 g. of 3-methoxy-4-hydroxy-hydrocinnamic acid in 50 ml. of anhydrous propanol until saturation is reached, and then the solution is refluxed for 5 hours. It is then evaporated to dryness in vacuo, and the residue is taken up in diethyl ether. The ethereal solution is washed with water, saturated sodium bicarbonate solution and again with water, dried over sodium sulfate, evaporated in vacuo and the residue is distilled under 0.001 torr. The 3-methoxy-4-hydroxy-hydrocinnamic acid propyl ester boils under this pressure at 118–124°.

(b) In an analogous manner to (a), 3-methoxy-4-hydroxy-cinnamic acid n-butyl ester, B.P. 190–194°/0.01 torr, is obtained from 3-methoxy-4-hydroxy-cinnamic acid with n-butanol, 3-ethoxy-4-hydroxy-cinnamic acid ethyl ester, B.P. 180–185°/0.01 torr, M.P. 54–56°, is obtained from 3-ethoxy-4-hydroxy-cinnamic acid with ethanol, 3-methoxy-4-hydroxy-hydrocinnamic acid methyl ester, B.P. 120–121°/0.01 torr, is obtained from 3-methoxy-4-hydroxy-hydrocinnamic acid with methanol, and 3-methoxy-4-hydroxy-hydrocinnamic acid ethyl ester, B.P. 121–122°/0.005 torr, M.P. 43–44°, from ether/pentane from 3-methoxy-4-hydroxy-hydrocinnamic acid with ethanol, and 3-methoxy-4-hydroxy-cinnamic acid ethyl ester, M.P. 56–58° from ether/hexane, from 3-methoxy-4-hydroxy-cinnamic acid with ethanol.

EXAMPLE 2

(a) 25 g. of 3-methoxy-4-hydroxy-cinnamic acid n-butyl ester are dissolved in 250 ml. of ethanol, and the solution is hydrogenated at 20° under atmospheric pressure with hydrogen in the presence of Raney nickel. The catalyst is then filtered off under suction, washed with ethanol and the filtrates are evaporated in vacuo. On distilling the residue at 151–152° and 0.006 torr, 3-methoxy-4-hydroxy-hydrocinnamic acid butyl ester is obtained.

(b) In an analogous manner to (a), 3-ethoxy-4-hydroxy-hydrocinnamic acid methyl ester, B.P. 135–140°/0.02 torr, is obtained from 3-ethoxy-4-hydroxy-cinnamic acid methyl ester with hydrogen, and 3-ethoxy-4-hydroxy-hydrocinnamic acid ethyl ester, M.P. 38–39.5°, recrystallized from diethyl ether/pentane, is obtained from 3-ethoxy-4-hydroxy-cinnamic acid ethyl ester.

EXAMPLE 3

(a) A solution of 21 g. of 3-methoxy-4-hydroxyphenethyl alcohol in 100 ml. abs. ethanol is added to a solution of 2.9 g. of sodium in 100 ml. of abs. ethanol and the mixture is refluxed for 15 minutes. 0.5 g. of sodium iodide are added as well as, dropwise, 20.6 g. of chloroacetic acid diethylamide, and the whole is refluxed until the reaction of the reaction mixture is neutral. After cooling to 20°, precipitated sodium chloride is filtered off under suction and washed with ethanol and the filtrate is concentrated in vacuo. The residue is taken up in chloroform, washed with 2 N sodium hydroxide solution and water, dried over sodium sulfate and concentrated in vacuo. Distillation of the residue under 0.01 torr yields 2-methoxy-4-(2'-hydroxy-ethyl)-phenoxyacetic acid diethylamide which boils at 222–225° under this pressure.

(b) The following compounds are obtained analogously to (a) from chloroacetic acid diethylamide:

2-methoxy-4-(3'-hydroxy-propyl)-phenoxyacetic acid diethylamide, B.P. 218–223°/0.009 torr, with 3-(3'-methoxy-4'-hydroxy-phenyl)-propan-1-ol, produced as described in Example 2(c) further below;

2-methoxy-4-(3'-hydroxy-1'-propenyl)-phenoxyacetic acid diethylamide, B.P. 213°/0.005 torr, with 3-(4'-hydroxy-3'-methoxy-phenyl)-2-propen-1-ol (coniferyl alcohol);

2-ethoxy-4-hydroxymethyl-phenoxyacetic acid diethylamide, B.P. 202°/0.05 torr, with 3-ethoxy-4-hydroxybenzyl alcohol; and 2-methoxy-4-(3'-hydroxy-propyl)-phenoxyacetic acid-(N-ethoxy-ethylamide), B.P. 201–207°/0.01 torr, is obtained from chloroacetic acid-(N-ethoxy-ethylamide) with 3-(3'-methoxy-4'-hydroxyphenyl)-propan-1-ol.

EXAMPLE 4

(a) A solution of 29.2 g. of 3-ethoxy-4-hydroxy-hydrocinnamic acid ethyl ester, produced as described in Example 2(b), in 50 ml. of abs. diethyl ether is added dropwise, while vibrating well, to a suspension of 9.3 g. of lithium aluminum hydride in 150 ml. of abs. diethyl ether, the addition being made so quickly that the reaction mixture gently boils. On completion of the dropwise addition, the reaction mixture is refluxed for another 3 hours and then 240 ml. of water are added, while vibrating well and cooling with ice, within 2½ hours. 100 ml. of diethyl ether are then added and carbon dioxide is introduced until saturation is reached. The ethereal phase is separated, the aqueous phase is extracted with acetic acid ethyl ester, the combined organic phases are washed with saturated sodium chloride solution, dried over sodium sulfate and concentrated in vacuo. The residue is recrystallized from diethyl ether/pentane; the 3-(3'-ethoxy-4'-hydroxy-phenyl)-propan-1-ol obtained melts at 63–64°.

(b) 2-ethoxy-4-(3'-hydroxy-propyl)-phenoxyacetic acid diethylamide, B.P. 215°/0.06 torr, is produced analogously to Example 3(a) from the phenyl propanol derivative obtained according to (a) of this example with chloroacetic acid diethylamide.

(c) 3-(3'-methoxy-4'-hydroxy-phenyl)-propan-1-ol is obtained analogously to (a) from the corresponding ester obtained according to Example 1.

(d) 3-methoxy-4-hydroxy-phenethyl alcohol is obtained analogously to (a) from the corresponding ester obtained according to Example 1.

EXAMPLE 5

15.4 g. of vanillyl alcohol and 4 g. of sodium hydroxide are dissolved in a boiling mixture of 4 ml. of water and 50 ml. of ethanol, 0.5 g. of sodium iodide and 16 g. of chloroacetic acid diethylamide are added and the reaction mixture is refluxed for another 14 hours under reflux. It is then cooled to 20°, precipitated sodium chloride is filtered off under suction and washed with ethanol, and the filtrate is concentrated in vacuo. The residue is taken up in chloroform, washed with 2 N sodium hydroxide solution and saturated sodium chloride solution, dried over sodium sulfate and concentrated in vacuo. The residue is fractionated under 0.005 torr; the 2-methoxy-4-hydroxy-methyl-phenoxyacetic acid diethylamide boils under this pressure at 180° and solidifies into crystals which melt at 42–43°. Recrystallization from methylene chloride/diethyl ether/pentane raises the melting point to 43–44°.

EXAMPLE 6

(a) 304 g. of vanillin are refluxed for 15 minutes in a solution of 80 g. of sodium hydroxide in 80 ml. of water and a liter of ethanol. 320 g. of chloroacetic acid diethylamide are then added dropwise, and the reaction mixture is boiled for another 6 hours. It is then cooled, the precipitated sodium chloride is filtered off and washed with ethanol. The filtrate is concentrated in vacuo, the residue is taken up in chloroform, the chloroform solution is washed with 2 N sodium hydroxide solution and water, dried over sodium sulfate and concentrated in vacuo. Distillation of the residue under 0.002 torr yields 2-methoxy-4-formyl-phenoxyacetic acid diethylamide which boils at 164° under this pressure. It can be recrystallized from methylene chloride/diethyl ether/hexane; M.P. 75–77°.

(b) 10 g. of 2-methoxy-4-formyl-phenoxyacetic acid diethylamide are dissolved in 100 ml. of methanol and the solution is reduced with hydrogen under normal pressure at 20° in the presence of Raney nickel. The catalyst is removed from the hydrogenation solution by filtration, washed with methanol and the filtrate is concentrated in vacuo. The residue is fractionated under 0.005 torr; 2-methoxy-4-hydroxymethyl-phenoxyacetic acid diethylamide boils under this pressure at 180°. It solidifies into crystals which melt at 42–43°. Recrystallization from methylene chloride/diethyl ether/pentane raises the melting point to 43–44°.

(c) 2-ethoxy-4-formyl - phenoxyacetic acid diethylamide, B.P. 176–180°/–0.05 torr, M.P. 41–44°, is obtained analogously to (a) from 166 g. of 3-ethoxy-4-hydroxy-benzaldehyde with 160 g. of chloroacetic acid diethylamide and, from this, 2-ethoxy-4-hydroxymethyl-phenoxyacetic acid diethylamide, B.P. 202°/0.05 torr, is produced analogously to (b) with hydrogen and Raney nickel.

EXAMPLE 7

137 g. of borontrifluoride etherate are added dropwise within 3 hours at 20° to 19.3 g. of sodium borohydride in 600 ml. of diethylene glycol dimethyl ether. The diborane is introduced, while stirring—which stirring is continued during the whole progress of the reaction—to a solution of 111 g. of 2-methoxy-4-allyl-phenoxyacetic acid diethylamide in 600 ml. of diethylene glycol dimethyl ether whereupon the reaction temperature rises from 20° to 43°. The mixture is reacted for another 2½ hours by the end of which time it has cooled to 20°. The excess diborane is then removed by introducing nitrogen and 250 ml. of water are added dropwise at a speed to ensure that the temperature does not exceed 30°. A solution of 57.5 g. of sodium hydroxide in 100 ml. of water is then added dropwise at 20–30° and within 40 minutes to the reaction mixture and then 151 g. of 30% hydrogen peroxide is added dropwise to the reaction mixture which has now become turbid, this addition also being made within 40 minutes, care being taken that the reaction temperature does not exceed 57°. Two phases are so formed to which 1.1 liters of water are added. The whole is stirred for 2 hours at 20°, the turbid emulsion obtained is extracted with benzene, the benzene solution is washed with 1 N hydrochloric acid, water, saturated aqueous sodium bicarbonate solution and again with water, dried over sodium sulfate and concentrated in vacuo. Distillation of the crude product under 0.009 torr yields 2-methoxy-4-(3'-hydroxy - propyl) - phenoxyacetic acid diethylamide which boils at 218–223° under this pressure.

EXAMPLE 8

(a) 7.7 g. of vanillyl alcohol are added to a solution of 1.15 g. of sodium in 50 ml. of anhydrous ethanol and the whole is refluxed for 15 minutes. 0.3 g. of sodium iodide and 7.7 g. of chloroacetic acid morpholide are added to the yellow solution so obtained and the whole is refluxed for another 4½ hours. At the end of this time the mixture has a neutral reaction and is evaporated in vacuo at 40°. 90 ml. of benzine/ether/water (1:1:1) are then added to the residue and the crystals so obtained are filtered off under suction. After thoroughly washing with benzine/ether/water (1:1:1), the pure 2-methoxy-4-hydroxymethyl-phenoxyacetic acid morpholide is obtained by recrystallization from acetone. M.P. 129–130°.

(b) On reacting vanillyl alcohol or 2-methoxy-4-(3'-hydroxy-propyl)-phenol with chloroacetic acid morpholide, chloroacetic acid piperidide or with chloroacetic acid pyrrolidide, the following compounds are obtained analogously to (a) supra:

2-methoxy-4-hydroxymethyl - phenoxyacetic acid piperidide, M.P. 107–108° (from ethyl acetate/pentane), 2-methoxy-4-hydroxymethyl-phenoxyacetic acid pyrrolidide, M.P. 114–115° (from chloroform/ethyl acetate), 2-methoxy-4-(3'-hydroxy - propyl) - phenoxyacetic acid morpholide, B.P. 200–203°/0.07 torr, $n_D^{20°}$=1.5530.

2-methoxy-4-(3'-hydroxy - propyl) - phenoxyacetic acid piperidide, B.P. 202–206°/0.0001 torr, $n_D^{23°}$=1.5506 and 2-methoxy-4-(3'-hydroxy - propyl) - phenoxyacetic acid pyrrolidide, B.P. 217–218°/0.001 torr, $n_D^{23°}$=1.5557.

EXAMPLE 9

(a) 6 g. of acetyl chloride are added at 20° while stirring to a solution of 7.2 g. of 2-methoxy-4-(2'-hydroxyethyl)-phenoxyacetic acid diethylamide in 40 ml. of pyridine whereby the temperature of the solution rises to 40°. The reaction mixture is stirred for another 24 hours, then poured into 95 ml. of water, 5 N hydrochloric acid is added until the reaction is acid to congo paper, and then it is extracted with chlorform. The chloroform extract is washed with 2 N hydrochloric acid, water, saturated aqueous sodium bicarbonate solution and water, dried over sodium sulfate and concentrated under reduced pressure. Distillation of the residue under high vacuum yields 2-methoxy-4-(2'acetoxy-ethyl)- phenoxyacetic acid diethylamide.

(b) From the 2-methoxy-4-hydroxymethyl-phenoxyacetic acid diethylamide produced according to Example 5, 2-methoxy-4-butyryloxymethyl-phenoxyacetic acid diethylamide, B.P. 181–183°/0.001 torr, $n_D^{20°}$: 1.5180, is obtained analogously to (a) of this example.

What is claimed is:

1. A therapeutical composition in dosage unit form comprising
    (1) an amount of 1 to 5% of a compound, 2-methoxy-4-(3'-hydroxy-propyl) - phenoxy - acetic acid N-ethoxy-N-ethyl-amide, 2-methoxy-4-(3'-hydroxy-1'-propenyl)-phenoxy-acetic acid N-ethoxy-N-ethylamide or 2-ethoxy-4-(3ıhydroxy-1'-propenyl)-phenoxy-acetic acid N-ethoxy-N-ethylamide
    (2) an effective amount of pharmaceutically acceptable solubilizing agent, and
    (3) a liquid pharmaceutically acceptable carrier.

2. A therapeutical composition as defined in claim 1 wherein said effective amount of pharmaceutically acceptable solubilizing agent and said liquid pharmaceutically acceptable carrier comprise (a) 10–25% of polyoxyethylene derivative of ricinoleic acid or of its glycerides,
(b) 5–15% of propylene glycol,
(c) 1–5% of poly-(N-vinyl-2-pyrrolidone) of medium molecular weight,
(d) 0–1.5% of glucose, and
(e) distilled water.

3. A therapeutical composition as defined in claim 2 wherein said compound is 2-methoxy-4-(3'-hydroxypropyl)-phenoxy-acetic acid N-ethoxy-N-ethyl-amide.

4. A therapeutical composition as defined in claim 1 wherein said compound is 2-methoxy-4-(3'hydroxy-1'-propenyl)-phenoxy-acetic acid N-ethoxy-ethylamide.

5. A therapeutical composition as defined in claim 1 wherein said compound is 2-ethoxy-4-(3'-hydroxy-1'-propenyl)-phenoxy-acetic acid N-ethoxy-ethylamide.

References Cited

UNITED STATES PATENTS

| | | | |
|---|---|---|---|
| 3,010,995 | 11/1961 | Litvan et al. | |
| 3,044,931 | 7/1962 | Holstius | 167—52.5 |
| 3,318,770 | 5/1967 | Asche et al. | 167—52 |

ALBERT T. MEYERS, Primary Examiner

J. D. GOLDBERG, Assistant Examiner

U.S. Cl. X.R.
260—559